(12) United States Patent
Liu

(10) Patent No.: US 10,610,972 B2
(45) Date of Patent: Apr. 7, 2020

(54) LASER CUTTING BASE AND LASER CUTTING DEVICE

(71) Applicant: BOE TECHNOLOGY GROUP CO., LTD., Beijing (CN)

(72) Inventor: Lu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 323 days.

(21) Appl. No.: 15/823,648

(22) Filed: Nov. 28, 2017

(65) Prior Publication Data

US 2018/0304412 A1 Oct. 25, 2018

(30) Foreign Application Priority Data

Apr. 25, 2017 (CN) .................... 2017 2 0441282 U

(51) Int. Cl.
| | | |
|---|---|---|
| B23K 26/384 | (2014.01) | |
| B23K 26/18 | (2006.01) | |
| B23K 37/04 | (2006.01) | |
| B23K 26/16 | (2006.01) | |
| B23K 26/38 | (2014.01) | |

(52) U.S. Cl.
CPC ............ *B23K 26/384* (2015.10); *B23K 26/16* (2013.01); *B23K 26/18* (2013.01); *B23K 26/38* (2013.01); *B23K 37/0408* (2013.01)

(58) Field of Classification Search
CPC ........ B23K 26/38; B23K 26/16; B23K 26/40; B23K 26/362; B23K 26/364; B23K 26/382; B23K 26/384; B23K 37/00; B23K 37/04–0408; B23K 37/02; B23K 15/08; B26D 7/01; B26D 7/015; B26D 7/018; B23Q 3/088; B25B 11/005

See application file for complete search history.

(56) References Cited

U.S. PATENT DOCUMENTS

| | | | | |
|---|---|---|---|---|
| RE31,053 E | * | 10/1982 | Firtion .................. | B25B 11/005 355/77 |
| 5,618,759 A | * | 4/1997 | Boysel .................. | B25B 11/005 438/464 |
| 9,595,483 B2 | * | 3/2017 | Shirai ..................... | H01L 22/20 |
| 9,688,563 B2 | * | 6/2017 | Ono ......................... | B26D 7/20 |
| 10,239,161 B2 | * | 3/2019 | Choi ................... | H01L 21/6838 |
| 10,297,488 B2 | * | 5/2019 | Fukuoka ............. | H01L 21/6838 |
| 2017/0120379 A1 | * | 5/2017 | Choi ................... | H01L 21/6838 |
| 2017/0137314 A1 | * | 5/2017 | Ono ......................... | B26D 7/20 |

* cited by examiner

*Primary Examiner* — Paul R Durand
*Assistant Examiner* — Randall A Gruby
(74) *Attorney, Agent, or Firm* — Calfee, Halter & Griswold LLP

(57) ABSTRACT

The present disclosure discloses a laser cutting base and a laser cutting device. The laser cutting base includes a base body, a recess and a filling structure. The base body includes a first surface configured to fixedly mount an element to be cut. The recess is formed by recessed inwardly from the first surface and corresponds to a position of a cutting line. The filling structure is filled in the recess and is able to prevent debris in the recess during cutting process from rebounding to the element to be cut.

10 Claims, 3 Drawing Sheets

LASER CUTTING BASE AND LASER CUTTING DEVICE

CROSS REFERENCE TO RELATED APPLICATIONS

This application claims the priority to and the benefit of Chinese Patent Application No. 201720441282.8, filed on Apr. 25, 2017, which is incorporated herein by reference in its entirety.

TECHNICAL FIELD

The present disclosure relates to a field of display technology, and particularly to a laser cutting base and a laser cutting device.

BACKGROUND

With the development of display technology, various display devices appear in daily life. In prior art, during a manufacturing process of display devices, a display panel or display substrate in large size generally needs to be cut into a display panel or display substrate in small size which is used to manufacture the display device.

In present, a cutting process is performed by laser cutting technology. During a common laser cutting process, an element to be cut is fixed on a laser cutting base, and then cut by a laser transmitter.

However, during the cutting process by the current laser cutting base, stress cracks are prone to be occurred at the element to be cut along a cutting line, which will shorten service life of the product.

The above-mentioned information disclosed in this Background section is only for the purpose of enhancing the understanding of background of the present disclosure.

SUMMARY

A major objective of the present disclosure is to overcome at least one defect of the prior art and provides a laser cutting base so as to avoid the stress cracks being generated at the element to be cut along a cutting line.

Another major objective of the present disclosure is to overcome at least one defect of the prior art and provides a laser cutting base so as to prevent debris produced during the cutting process from rebounding to a back board of the element to be cut, thusly improving the quality of the product.

Another major objective of the present disclosure is to overcome at least one defect of the prior art and provides a laser cutting device so as to avoid the stress cracks being generated at the element to be cut along a cutting line.

In order to achieve the foregoing objectives of the present disclosure, the present disclosure adopts the following technical solutions.

According to an aspect of the present disclosure, there is provided a laser cutting base including a base body, a recess and a filling structure. The base body includes a first surface configured to fixedly mount an element to be cut. The recess is formed by recessed inwardly from the first surface and corresponds to a position of a cutting line. The filling structure is filled in the recess and is able to prevent debris in the recess during a cutting process from rebounding to the element to be cut.

According to another aspect of the present disclosure, there is provided a laser cutting device including a laser transmitter and a laser cutting base. The laser transmitter is configured to transmit laser to the laser cutting base. Wherein, the laser cutting base includes a base body, a recess and a filling structure. The base body includes a first surface configured to fixedly mount an element to be cut. The recess is formed by recessed inwardly from the first surface and corresponds to a position of a cutting line. The filling structure is filled in the recess and able to prevent debris in the recess during cutting process from rebounding to the element to be cut.

BRIEF DESCRIPTION OF THE DRAWINGS

Various objectives, features and advantages of the present disclosure will become more apparent by considering the following detailed description of preferred embodiments of the present disclosure with reference to the accompanying drawings. The accompanying drawings are merely exemplary illustration of the present disclosure, and are not necessarily drawn to scale. The same reference numerals in the accompanying drawings always indicate the same or similar components. In the accompanying drawings.

DETAILED DESCRIPTION

Now, exemplary embodiments will be described more comprehensively with reference to the drawings. However, the exemplary embodiments may be carried out in various manners, and shall not be interpreted as being limited to the embodiments set forth herein; instead, providing these embodiments will make the present disclosure more comprehensive and complete, and will fully convey the conception of the exemplary embodiments to those skilled in the art. Throughout the drawings, the same reference signs indicate the same or similar structures, and their detailed description will be omitted.

A laser cutting base in prior art may include a base body 1 and adsorption holes 3 provided at the base body 1. An element to be cut could be adsorbed on the laser cutting base due to the negative pressure at the adsorption holes 3, with detailed reference to FIG. 1.

Figure 1:
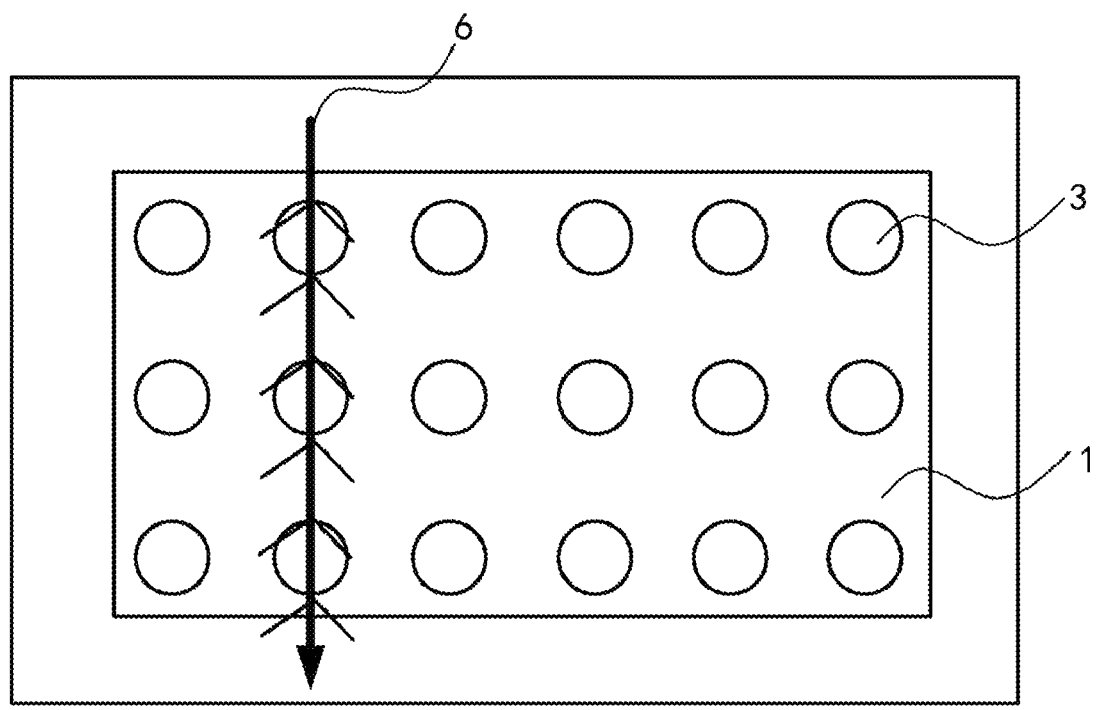
FIG. 1 is a schematic view of a laser cutting base in prior art.

However, during a cutting process by laser, as shown in FIG. 1, when the cutting line 6 (illustrated by an arrow in FIG. 1) passes through the adsorption holes 3, due to an acting force of the negative pressure at the adsorption holes 3, stress crack defects will occur along a cutting line position at the element to be cut, which will reduce the yield of the product. Wherein, portions where the defects are not flat are weak points of the element after cutting. In the subsequent using process, the stress cracks will extend continuously from the defect position, thusly resulting in the failure of the element. Especially to a slim bezel display device, because fewer portion of element is shielded by the bezel, the stress cracks are prone to extend to a display area, which will result in the failure of the element, thusly shortening the service life of the product.

In addition, during the cutting process by the current laser cutting base in prior art, debris produced during the cutting process usually rebounds to a back board of the element to be cut, which will cause pollution to the back board, thusly affecting the quality of the product.

Figure 2:
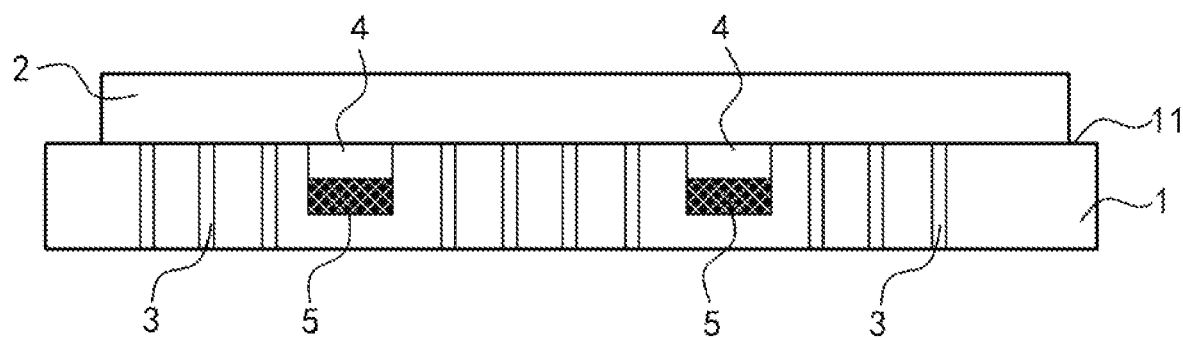
FIG. 2 is a schematic view of a laser cutting base according to the exemplary embodiment.

FIG. 2 is a schematic view of a laser cutting base according to the exemplary embodiment.

Figure 3:
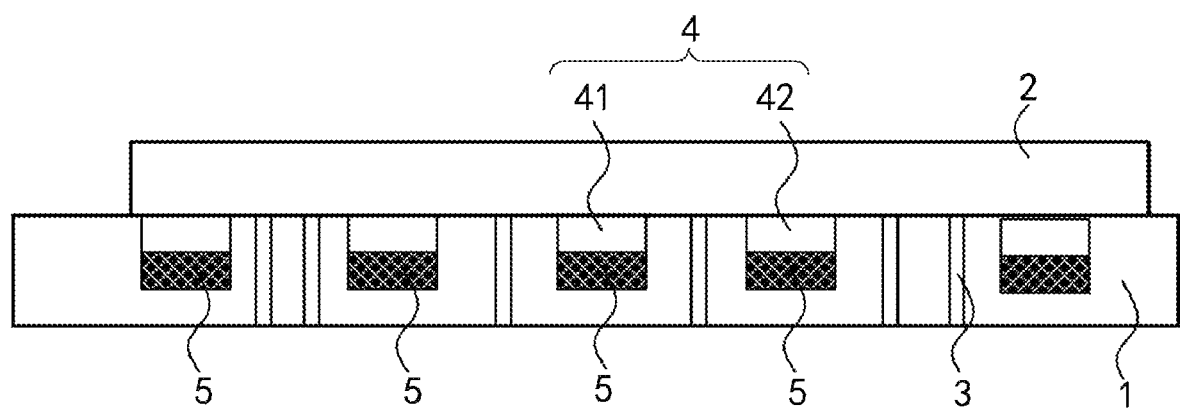
FIG. 3 is a schematic view of another laser cutting base according to the exemplary embodiment.

As shown in FIGS. 2 and 3, according to the embodiment of the present disclosure, a laser cutting base is provided, which includes a base body 1, a recess 4 and a filling structure 5. The laser cutting base according to the embodiment of the present disclosure includes the recess 4 and the filling structure 5 provided in the recess 4, which could improve the yield of the product in the case of ensuring the element to be cut 2 to be adsorbed stably.

Referring to FIGS. 2 and 3 again, according to the embodiment of the present disclosure, the recess 4 may be located at a position where the element to be cut 2 is to be cut, and corresponds to a position of a cutting line. Because there is no need to provide the adsorption hole 3 at the recess 4, the element to be cut 2 at the position of the recess 4 will not be applied adsorption force from the adsorption hole 3 when being fixed on the laser cutting base. That is, due to the recess 4 at the laser cutting base of the present disclosure, the stress cracking defect caused by the adsorption force of the adsorption hole 3 in the prior art can be avoided.

Referring to FIGS. 2 and 3 again, according to the embodiment of the present disclosure, a filling structure 5 may be provided in the recess 4 so as to prevent debris in the recess 4 produced during the process for cutting the element to be cut 2 from rebounding to a back board of the element to be cut 2, thusly improving the yield of the product. Wherein, the back board in the present disclosure refers to a side of the element to be cut 2 adjacent to the base body 1. According to practical requirements, the filling structure 5 in the present disclosure may be an integrated component, or a filled layer structure formed by a plurality of granular structures, which fall within the protection scope required by the present disclosure. According to practical requirements, the filling structure 5 may be made of flexible or rigid material. Any material, having function of preventing debris from rebounding to a back board of the element to be cut 2 in the cutting process, falls within the protection scope required by the present disclosure.

Referring to FIGS. 2 and 3 again, according to the embodiment of the present disclosure, the base body 1 may include a first surface 11 for fixing the element to be cut 2. The first surface 11 may be flat, but not limited thereto. According to another embodiment of the present disclosure, the recess 4 may be formed by recessed inwardly from the first surface 11 to the base body 1.

Referring to FIGS. 2 and 3 again, according to the embodiment of the present disclosure, the thickness of the filling structure 5 may be smaller than the depth of the recess 4, such that an isolation space will be formed in the recess 4, which could prevent debris produced during the cutting process from adhering to the back board of the element to be cut 2. According to an embodiment of the present disclosure, the thickness of the filling structure 5 may be 30%-70% of the depth of the recess 4.

Referring to FIGS. 2 and 3 again, according to the embodiment of the present disclosure, the filling structure 5 may be made of an activated carbon or a porous adsorption film, but not limited thereto. The material of the filling structure 5 may be selected according to actual requirement, which will fall within the protection scope required by the present disclosure.

Referring to FIGS. 2 and 3 again, according to the embodiment of the present disclosure, the depth of the recess 4 may be 5 mm-20 mm, such as, but not limited to 6 mm, 7 mm, 8 mm, 10 mm, 15 mm. The depth of the recess 4 may be selected according to actual requirement and will fall within the scope of protection required by the present disclosure. In the absence of the opposite explanation, the depth of the recess mentioned in the present disclosure refers to the distance between an upper boundary and a lower boundary of the recess, as shown in FIGS. 2 and 3.

Referring to FIG. 3 again, according to the embodiment of the present disclosure, the recess 4 may include a first recess 41 and a second recess 42. The width of the first recess 41 may be larger than that of the second recess 42. The width of the first recess 41 and that of the second recess 42 are designed to be different with each other so as to meet requirements of different cutting dimensions, therefore the same laser cutting base could be used for different cutting situations, thusly reducing manufacturing cost. The width of the first recess 41 may be such as, but not limited to 6 inches, and the width of the second recess 42 may be such as, but not limited to 7 inches. The width of the recess 41 and that of the second recess 42 may be selected according to actual requirement, which will fall within the protection scope required by the present disclosure. According to an embodiment of the present disclosure, during the cutting process by the laser cutting base, some recesses 4 to be used is filled with the filling structure 5, while recesses 4 not to be used is alternative to filled with the filling structure 5 or not, which falls within the protection scope required by the present disclosure. In the absence of the opposite explanation, the width of the recess mentioned in the present disclosure refers to the distance between a left side boundary and a right side boundary of the recess, as shown in FIGS. 2 and 3.

Referring to FIGS. 2 and 3 again, according to the embodiment of the present disclosure, the base body 1 may include an adsorption area where the adsorption holes 3 are located, which is used to provide adsorption force for the element to be cut 2, but not limited thereto. The fixing manner may be selected by the person skilled in the art according to actual requirement, which will fall within the protection scope required by the present disclosure.

Referring to FIGS. 2 and 3 again, according to an embodiment of the present disclosure, the recess 4 may be disposed between adjacent adsorption areas. According to an embodiment of the present disclosure, the element to be cut 2 is generally cut by the cutting line 6 along the recess 4, therefore, the recess 4 and the adsorption area may be interspaced with each other. Wherein, the position of the cutting line 6 corresponds to the recesses, such as, but not limited to corresponding to the center line of the recesses.

Referring to FIGS. 2 and 3 again, according to an embodiment of the present disclosure, the aperture of the adsorption hole 3 is 0.5 mm-5 mm, such as, but not limited to 1 mm, 2 mm, 3 mm, 4 mm. The aperture of the adsorption hole 3 may be selected according to actual requirement and will fall within the protection scope required by the present disclosure.

Referring to FIGS. 2 and 3 again, according to an embodiment of the present disclosure, the difference between the distance between the center of the adsorption hole 3 and the adjacent recess 4 and the radius of the adsorption hole 3 may be 0.5 mm-10 mm, which may better ensure the cutting position not to be affected by negative pressure when cutting the element to be cut 2, thusly further improving the yield of products. The difference between the distance between the center of the adsorption hole 3 and the adjacent recess 4 and the radius of the adsorption hole 3 may be such as, but not limited to 1 mm, 2 mm, 3 mm, 4 mm, 5 mm, 6 mm, 7 mm, 8 mm, 9 mm, or may be 1.5 mm, 2.5 mm, 3.5 mm, 4.5 mm, 5.5 mm, 6.5 mm, 7.5 mm, 8.5 mm, 9.5 mm. A plurality of adsorption holes 3 may be provided in each adsorption area. According to an embodiment of the present disclosure, a plurality of adsorption holes 3 may be evenly arranged in the adsorption area, such that the force applied to the element to be cut 2 would be more uniform after the element to be cut 2 is fixed.

According to another aspect of the present disclosure, a laser cutting device is provided, which includes a laser transmitter and the laser cutting base according to the present disclosure. The laser transmitter could transmit laser to the laser cutting base.

As can be seen from the above technical solutions, the laser cutting base and the laser cutting device provided by the present disclosure have the following advantages and positive effects: the laser cutting base according to the present disclosure includes the recess, which could avoid the stress cracking defect caused by the adsorption force of the adsorption hole in the prior art, thusly improving the yield of products. Furthermore, the laser cutting base provided by the present disclosure further includes the filling structure disposed in the recess, which could prevent debris in the recess produced during the process for cutting the element to be cut from rebounding to a back board of the element to be cut, thusly improving the yield of the product.

The features, structures or characteristics described in the present disclosure may be combined in any suitable manner in one or more embodiments. Many concrete details are provided in the above descriptions to fully understand the embodiments of the present disclosure. However, those skilled in the art will realize that the technical solutions of the present disclosure may be practiced without one or more of the specific details, or other methods, components, materials and the like may be used. In other circumstances, well-known structures, materials or operations are not shown or described in detail to avoid confusion of respective aspects of the present disclosure.

What is claimed is:

1. A laser cutting device, comprising: a laser transmitter and a laser cutting base, wherein the laser transmitter is configured to transmit laser to the laser cutting base; and the laser cutting base comprises:
   a base body comprising a first surface configured to fixedly mount an element to be cut;
   a recess formed by recessed inwardly from the first surface and corresponding to a position of a cutting line; and
   a filling structure filled in the recess and configured to prevent debris in the recess during a cutting process from rebounding to the element to be cut.

2. The laser cutting device according to claim 1, wherein, a thickness of the filling structure is smaller than a depth of the recess.

3. The laser cutting device according to claim 1, wherein, a thickness of the filling structure is 30%-70% of a depth of the recess.

4. The laser cutting device according to claim 1, wherein, the filling structure is made of an activated carbon or a porous adsorption film.

5. The laser cutting device according to claim 1, wherein, a depth of the recess is 5 mm-20 mm.

6. The laser cutting device according to claim 1, wherein, the recess comprises a first recess and a second recess, and a width of the first recess is larger than a width of the second recess.

7. The laser cutting device according to claim 1, wherein, the base body comprises adsorption areas wherein each adsorption area comprises adsorption holes, the adsorption areas are configured to provide an adsorption force for the element to be cut, and the recess is disposed between adjacent adsorption areas.

8. The laser cutting device according to claim 7, wherein, an aperture of at least one adsorption hole is 0.5 mm-5 mm.

9. The laser cutting device according to claim 7, wherein, a difference between a distance between an center of an adsorption hole and a recess adjacent to that adsorption hole and a radius of that adsorption hole is 0.5 mm-10 mm.

10. The laser cutting device according to claim 7, wherein, the adsorption holes are evenly arranged in each adsorption area.

\* \* \* \* \*